(12) United States Patent
Meckler

(10) Patent No.: US 8,225,977 B2
(45) Date of Patent: Jul. 24, 2012

(54) WIRE FEEDER WITH RUN-IN CONTROL

(75) Inventor: Andreu P. Meckler, Euclid, OH (US)

(73) Assignee: Lincoln Global, Inc., City of Industry, CA (US)

( * ) Notice: Subject to any disclaimer, the term of this patent is extended or adjusted under 35 U.S.C. 154(b) by 1341 days.

(21) Appl. No.: 10/794,872

(22) Filed: Mar. 8, 2004

(65) Prior Publication Data
US 2005/0194416 A1 Sep. 8, 2005

(51) Int. Cl.
*B65H 51/10* (2006.01)
(52) U.S. Cl. ............... 226/1; 226/25; 226/181; 226/188
(58) Field of Classification Search ............... 226/1, 24, 226/25, 178, 181, 188, 108; 219/76.14
See application file for complete search history.

(56) References Cited

U.S. PATENT DOCUMENTS

| | | | | |
|---|---|---|---|---|
| 3,586,221 A | * | 6/1971 | Rosen | 226/1 |
| 3,979,248 A | * | 9/1976 | Kussmaul | 156/358 |
| 4,079,231 A | * | 3/1978 | Toth | 219/130.32 |
| 5,898,285 A | * | 4/1999 | Nagasawa et al. | 318/568.13 |
| 6,531,684 B2 | * | 3/2003 | Rice et al. | 219/130.21 |
| 6,548,783 B1 | * | 4/2003 | Kilovsky et al. | 219/125.1 |
| 2002/0190043 A1 | * | 12/2002 | Rice et al. | 219/130.31 |

* cited by examiner

*Primary Examiner* — Michael Mansen
*Assistant Examiner* — Scott Haugland
(74) *Attorney, Agent, or Firm* — Hahn Loeser & Parks LLP

(57) ABSTRACT

A wire feeder for an electric arc welder comprising feed rolls driven by an electric motor for moving a welding wire toward a workpiece for an arc welding process. The motor is rotated at a speed determined by a WFS signal from a controller when energized by actuation of a start switch, a switch network has a first condition allowing the motor to operate at the speed determined by the WFS signal and a second override condition forcing the motor to rotate at a fixed lower speed, a toggle circuit with a first position to shift the switch network into the second condition upon actuation of the motor start switch and a second position to shift the switch network to the first condition upon receipt of a toggle signal, and a device to create the toggle signal when the load current to the motor exceeds a given value.

11 Claims, 2 Drawing Sheets

//  WIRE FEEDER WITH RUN-IN CONTROL

The present invention relates to the art of electric arc welding and more particularly to a wire feeder used in electric arc welder and provided with a wire run-in control.

BACKGROUND OF INVENTION

Electric arc welding involves a supply of welding wire, in a drum or on a spool, which wire is driven by a wire feeder from the supply toward the workpiece to be welded. The wire passes through a contact sleeve to connect current from a power source to the welding operation. During automatic or semi-automatic welding, the wire is fed toward the workpiece as a controlled welding current is directed to the contact sleeve. To feed the wire toward the workpiece, the welder is provided with a wire feeder having a series of feed rolls driven by an electric motor at a welding wire feed speed (WFS) controlled by an input voltage to the motor. The level of voltage to the motor is a parameter that controls the wire feed speed during the welding operation. When the welding process is started by a trigger or other start sequence device, the motor rotates to drive the feed roll, usually through a gear box, to properly carry welding wire to the workpiece welding operation. At the start of the weld sequence, the wire is driven toward the workpiece before an arc has been created. In some welders, the speed of driving the wire toward the workpiece is a fixed slow speed known as a run-in speed. After the wire has created an arc, the motor shifts from the running speed to the control wire feed speed necessary for the particular process being implemented. The reduced fixed run-in speed is needed only at the start sequence before the arc has been created to initiate the welding process. When the wire contacts the workpiece the arc is established and the run-in speed should be terminated immediately in favor of the wire feed speed. In the past, an automatic control circuit has been proposed where the current in the welding wire is sensed to indicate when an arc has been created. At that time, the wire feed speed is shifted from the run-in speed to the wire feed speed (WFS). The wire feed speed is a preset level determined by the controller for use in a particular welding process. The disadvantage is that separate wiring in the welding circuit is required.

THE PRESENT INVENTION

The present invention does not use the arc current to shift the motor from the low run-in speed to WFS. To the contrary, the invention involves directly sensing the presence of the load current of the drive motor, which current reflects the load that the motor is driving against. By sensing the load current change in the motor itself, a control circuit or system is provided that shifts the run-in speed to WFS as soon as the wire contacts the workpiece. Thus, there is no need to tap into the welding circuit. When the wire contacts the workpiece, the controlled wire feed speed (WFS) is implemented by the controller of the motor driving the feed rolls. The wire is fed in at a reduced rate of speed. When the wire contacts the work, the load current in the motor increases to compensate for an additional load caused by contact of the wire with the workpiece. The motor control circuit senses the difference in the load current of the motor and increases the wire feed speed to the preset WFS level when the motor load current reaches a given level. In an option of the present invention, a timer is provided with a time-out feature, so the motor speed increases to the preset WFS if contact with the workpiece is not sensed within a set amount of time. In accordance with another aspect of the invention, the control system for shifting to the control wire feed speed can be disabled in certain modes of operation.

In accordance with the present invention there is provided a controller for the speed of the motor driving the feed rolls of the wire feeder for use in an electric arc welder, wherein the motor has a low fixed or presentable run-in speed and a controlled VFS. The controller comprises a timing circuit actuated upon starting of the motor to drive the motor at the run-in speed. This timing circuit has a time-out condition at a given time to shift the motor from the running speed to the wire feed speed. There is provided an override circuit responsive to the load current of the drive motor to shift the motor from the run-in speed to the wire feed speed before the given time-out of the timer when the motor load current reaches a fixed value or level.

In accordance with another aspect of the present invention there is provided a method of operating the motor driving the feed rolls of the wire feeder used in an electric arc welder, where the motor has a fixed low run-in speed and a controlled wire feed speed. The method comprises starting the motor at the run-in speed, sensing the load current of the motor and shifting the motor from the run-in speed to the wire feed speed upon the load current reaching a given level. This method is further modified by shifting the motor from the run-in speed to the wire feed speed at a given time if the speed shift has not occurred during the given time when the motor load current is being monitored.

The primary object of the present invention is the provision of a wire feeder for an electric arc welder wherein the motor for the feeder is shifted between the run-in speed and a controlled wire feed speed when the load current of the motor indicates contact of the wire with the workpiece.

Another object of the present invention is the provision of a method for operating a wire feeder for an electric arc welder when the wire is driven at a run-in speed until the load current of the motor reaches a given level indicating contact of the wire with the workpiece. Then, the motor is shifted to the standard controlled feed speed operation for the welding process.

These and other objects and advantages will become apparent from the following description taken together with the accompanying drawings.

PREFERRED EMBODIMENT

Figure 1:
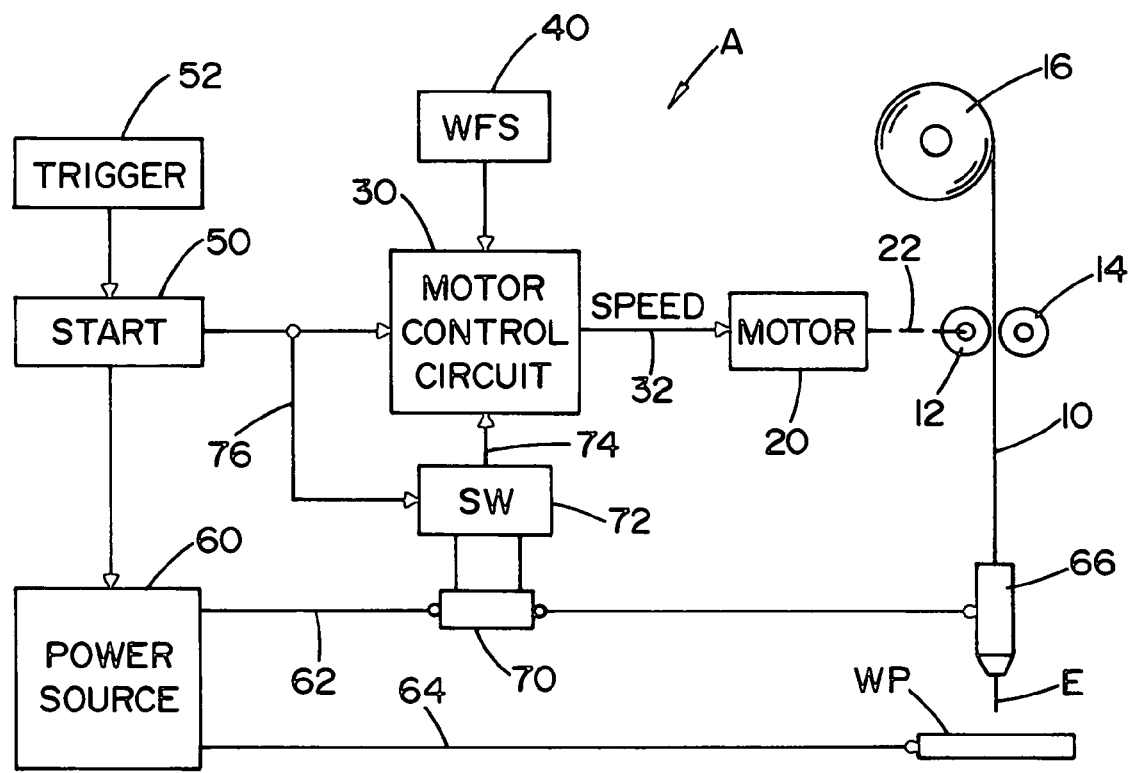
FIG. 1 is a schematic block diagram illustrating the prior art to which the present invention is directed.
Figure 2:
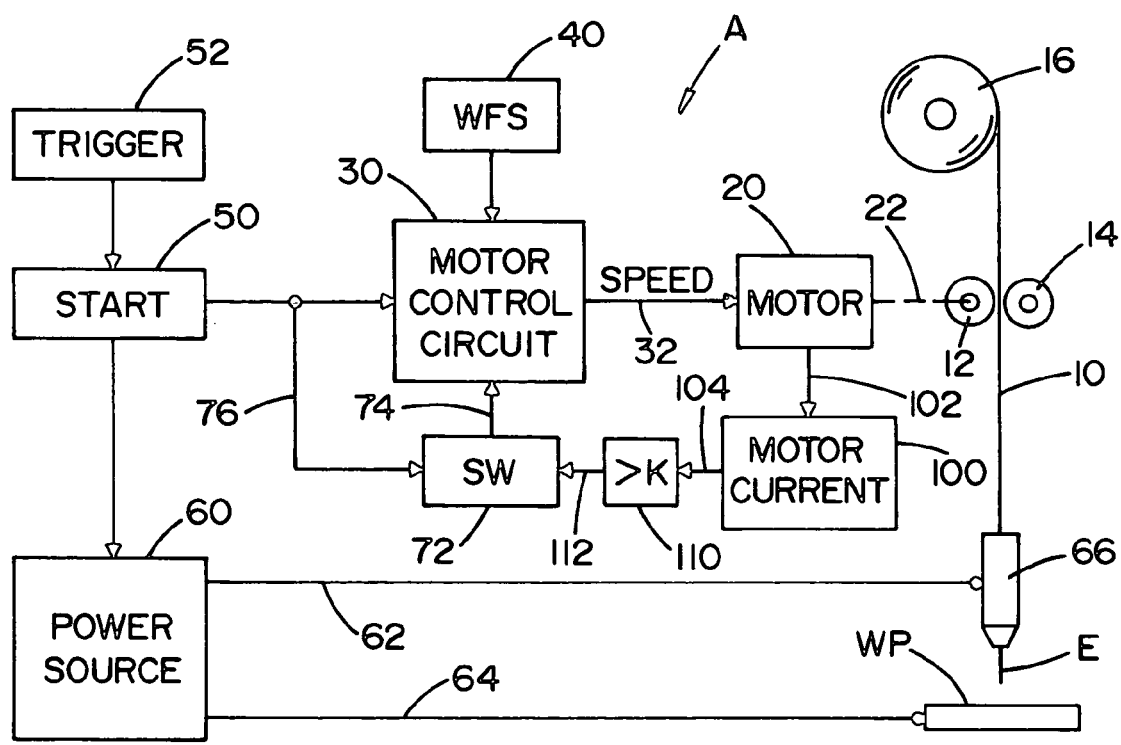
FIG. 2 is a block diagram, similar to FIG. 1, illustrating the preferred embodiment of the present invention; and, FIG. 3 is a flow chart showing a controller, method and system for operating the motor of a wire feeder using the present invention.

Referring now to FIGS. 1 and 2, a standard wire feeder A is schematically illustrated, wherein welding wire 10 is driven by feed rolls 12, 14 from a wire supply, shown as a spool 16. Motor 20 drives shaft 22, normally through a gear box, at a speed (WFS) determined for a particular welding process under direction of controller 30 having a voltage output line 32. The level of voltage on this line (which may be digital) determines the rotating speed of rolls 12, 14. Controller 30 has a preset wire feed speed determined by input information from block 40, which speed is coordinated with the desired welding process of the electric arc welder using the wire feeder. The arc welder includes a start sequence device 50, schematically illustrated as a trigger 52, although other start sequence devices are normally used in automatic welding. Power source 60 includes output leads 62, 64, one of which is connected to gun or torch 66 having an internal contact sleeve in accordance with standard welding technology. Wire 10 is driven by rolls 12, 14 toward workpiece WP so that the wire creates an extension E protruding from gun 66. Current is directed between extension E and workpiece WP by power source 60 when contact is made between the wire and the workpiece. Thereafter, rolls 12, 14 continue to drive welding wire 10 toward the workpiece at the desired wire feed speed maintained by controller 30 for practicing the desired welding process. In accordance with the prior art shown in FIG. 1, one of the power leads 62, 64 is provided with current shunt 70, or other current reading device such as a current transformer, for controlling a two position switching network 72. This network shifts motor 20 between a run-in speed, which is a low speed, and a wire feed speed (WFS) determined by the setting of the wire feed speed at block 40. Logic on line 74 from switching network 72 determines the speed setting of controller 30. The speed shifts between the run-in low speed and the controlled wire feed speed. In the prior art, when the arc current reached a given level, switching network 72 changed logic on line 72 to shift the motor from the low run-in speed to the normal wire feed speed for the welding process. This shifts occurs at the start of the welding operation, as indicated by logic on line 76. At the initiation of arc sequence device 50, switching network 72 shifts the controller to the run-in low speed. When current sensed by shunt 70 reaches a given welding level, indicating an arc, switching network 72 changes the logic on line 74. The logic on line 74 shifts from the run-in speed to the normal wire feed speed. Consequently, at the start of the welding operation, wire 10 moves toward workpiece WP as the voltage is applied across leads 62, 64. When extension E touches the workpiece, an arc is created and current flows through line 62. This current is sensed by shunt 70 shifting the logic on line 74 of switching network 72. This prior art has a slight hesitation which is overcome by the present invention illustrated in FIG. 2 and requires splicing of a weld lead.

The standard wire feeder A, as shown in FIG. 1, is modified as shown in FIG. 2 by removing the arc current sensor 70. The position of switching network 72 is determined by the logic on line 76 as previously indicated. To shift from the run-in speed by controller 30 to the controlled wire feed speed, the present invention employs a load current sensor 100 to measure the load current of motor 20 as detected through input 102. A signal, representative of the level of load current in motor 20, is outputted in line 104 directed to a comparator circuit 110 which has an adjusted value K indicative of a desired threshold current of motor 20 for shifting between the run-in speed and the wire feed speed. When motor 20 is initiated by start sequencer 50 to operate at a low speed for run-in, switching network 72 is in its first (run-in) position awaiting a toggle signal in output 112 of comparator 110. This toggle signal occurs when the voltage, or digital information, on output line 104 reaches a desired level indicative of the fact that the motor 20 has caused extension E to contact workpiece WP. When that occurs, a toggle signal is created in line 112. This toggles switching network 72 from the run-in speed position to the controlled wire feed speed position. The logic on line 74 instructs controller 30 to shift to the proper condition. Thus, contact of the wire with the workpiece initiates the shift of controller 30 from run-in operation to normal welding operation. Consequently, it is not necessary to determine whether a arc has been established which has the necessity of measuring the arc current. This is not necessary in implementing the present invention. There is no splicing of the weld leads.

Figure 3:
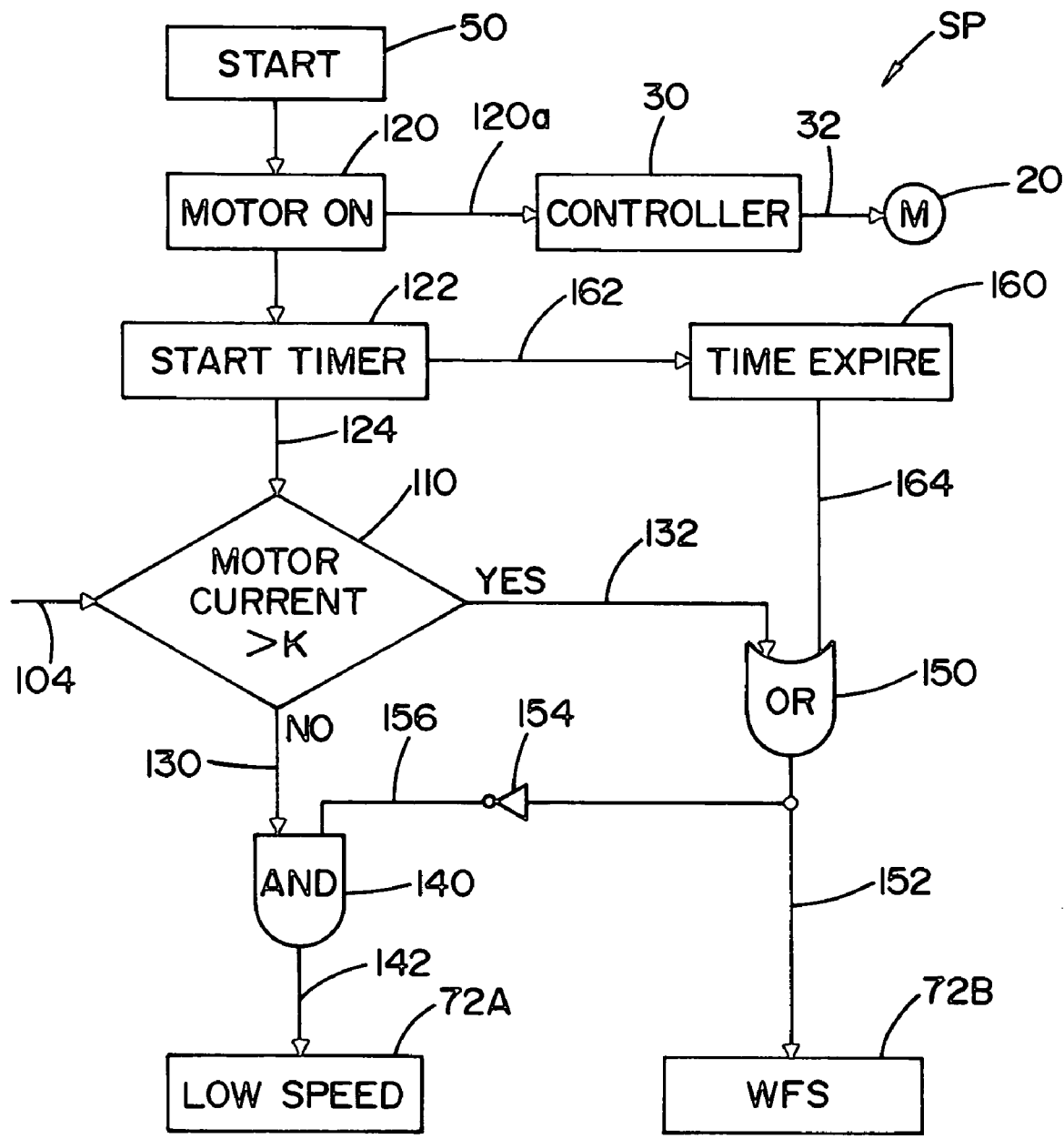

Implementation of the present invention is digitally, through the normal digital processor associated with the wire feeder, and a program to perform the invention is schematically illustrated in FIG. 3. Start program SP is initiated by start sequencer 50. The sequences cause the motor to rotate, as indicated by block 120. A digital signal on line 120a tells controller 30 to start operation of motor 20. At the same time, a digital timer 122 is started to implement an override aspect of the present invention. When timer 122 is started, a logic appears in line 124 to activate comparator 110 to determine the level of the motor load current appearing as a digital signal on line 104. If the load current is below a set level indicated by K, a signal appears in the NO line 130 to the input of AND gate 140 having an output 142. This output maintains motor 20 operating at low speed as indicated by the first condition 72A of switching network 72. When the motor load current on line 104 reaches the level K, a logic 0 appears in line 130 to give a logic 0 in line 142 terminating condition 72A. At this time a logic 1 appears in line 132. This line is an input of OR gate 150. A logic 1 at the OR gate gives a logic 1 in output line 152 to shift switching network 72 into its toggled position 72B causing high speed designated as WFS. At the same time, inverter 154 applies a logic 0 to AND gate 140. This produces a logic 0 in line 142 to deactivate the run-in speed of motor 20. Gate 140 produces a logic 0 in line 142 when there is a logic 1 in line 152 and a logic 1 in line 130 indicating that the level K has not been reached. Thus, timer 160 shifts network 72 to condition 72B at the time-out time even if this shift has not been made by comparator 110. This time-out concept is used at the start of the motor and before the load current reaches level K. After the level K has been reached, a logic 1 in line 132 produces a logic 1 in line 152 deactivating gate 140 from effect of a signal on line 164 and activating wire feed speed toggled condition 72B of network 72. In accordance with this aspect of the invention, there is an override to cause the wire feed speed of motor 20 after a preset time measured by timer 160, if there is no shift in logic in lines 130, 132. The timer is initiated by logic on line 162 from the start timer 122. When time has expired from timer 160, a logic 1 appears on line 164 producing a logic 1 in line 152 and a logic 0 in line 156. Thus, the run-in speed is terminated and the wire feed speed is initiated by timer 160. Other programs could be used to accomplish the present invention, as described in connection with FIG. 2. However, program SP has been employed successfully.

Having thus defined the invention, the following is claimed:

1. A wire feeder for an electric arc welder comprising:
   an electric motor,
   feed rollers designed to move a welding wire toward a workpiece during an arc welding process,
   a welding circuit,
   a welding wire feed circuit,
   a controller in the welding wire feed circuit designed to generate a WFS signal to control a speed of said electric motor, and
   a switching network in the welding wire feed circuit having a first condition that enables said electric motor to operate at a speed based on said WFS signal and a second override condition to cause said speed of said electric motor to be less than said speed based on said WFS signal,
   a comparator in the welding wire feed circuit having a load current preset value, said switching network shifting from said second override condition to said first condition based on a load current of the motor signal that exceeds the comparator load current preset value and that is independent of current detected through said welding circuit, and a time-out circuit that causes said switching network to shift from said second override condition to said first condition after a predetermined period of time.

2. The wire feeder as designed in claim 1 wherein said switching network shifts from said second override condition to said first condition upon detection of a load change on said electric motor.

3. The wire feeder as defined in claim 2, wherein said switching network shifts from said second override condition to said first condition upon detection of a predetermined load increase on said electric motor.

4. The wire feeder as defined in claim 3, including an override circuit to disable said switching network upon detection of certain welding modes.

5. The wire feeder as defined in claim 2, including an override circuit to disable said switching network upon detection of certain welding modes.

6. The wire feeder as defined in claim 1, including an override circuit to disable said switching network upon detection of certain welding modes.

7. A wire feeder for an electric welder comprising an electric motor, feed rollers designed to move a welding wire toward a workpiece during an arc welding process, a welding circuit, a welding wire feed circuit, a controller in the welding wire feed circuit designed to generate a preset WFS signal to control a speed of said electric motor, a switching network in the welding wire feed circuit having a first condition that enables said electric motor to operate at a speed based on said WFS signal and a second override condition to cause said speed of said electric motor to be less than said speed based on said WFS signal, a start sequence device designed to activate said controller, a comparator in the welding wire feed circuit having a load current preset value, and means for causing said switching network to shift from said second override condition to said first condition based on a load current of the motor signal that exceeds the comparator load current preset value and, said means being at least partially independent of current detected through said welding circuit, and means to cause said switching network to shift from said second override condition to said first condition after a predetermined period of time.

8. The wire feeder as defined in claim 7, wherein said means causes said switching network to shift from said second override condition to said first condition upon detection of a load change on said electric motor.

9. The wire feeder as defined in claim 8, wherein said means causes said switching network to shift from said second override condition to said first condition upon detection of predetermined load change on said electric motor.

10. A method of operating a wire feeder motor that is used to drive the feed rollers of a wire feeder used in electric arc welding operation, said wire feeder motor operable at a lower run-in speed and at a faster controlled WFS, said method comprising:

(a) starting said wire feeder motor at said lower run-in speed;

(b) sensing a load current of said wire feeder motor in a welding wire feed circuit, said step of sensing occurring independently of current detected through a welding wire circuit;

(c) comparing said load current of said wire feeder motor to a preset load current value; and (d) shifting said wire feeder motor from said lower run-in speed to said faster WFS upon detection of said load current increasing to or above said preset load current value, and further comprising the step of, (e) shifting said wire feeder motor from said lower run-in speed to said faster WFS after a given time after said starting of said wire feeder motor if said wire feeder motor is still operating at said lower run-in speed.

11. The method as defined in claim 10, including the step of shifting said wire feeder motor between said lower run-in speed and said faster WFS upon detection of certain welding modes.

* * * * *

UNITED STATES PATENT AND TRADEMARK OFFICE
CERTIFICATE OF CORRECTION

| | |
|---|---|
| PATENT NO. | : 8,225,977 B2 |
| APPLICATION NO. | : 10/794872 |
| DATED | : July 24, 2012 |
| INVENTOR(S) | : Meckler |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1804 days.

Signed and Sealed this
Twenty-sixth Day of March, 2013

Teresa Stanek Rea
*Acting Director of the United States Patent and Trademark Office*